July 13, 1954  H. P. TROENDLY  2,683,510
ONE-WAY ENGAGING DEVICE
Filed Dec. 29, 1950  2 Sheets-Sheet 1
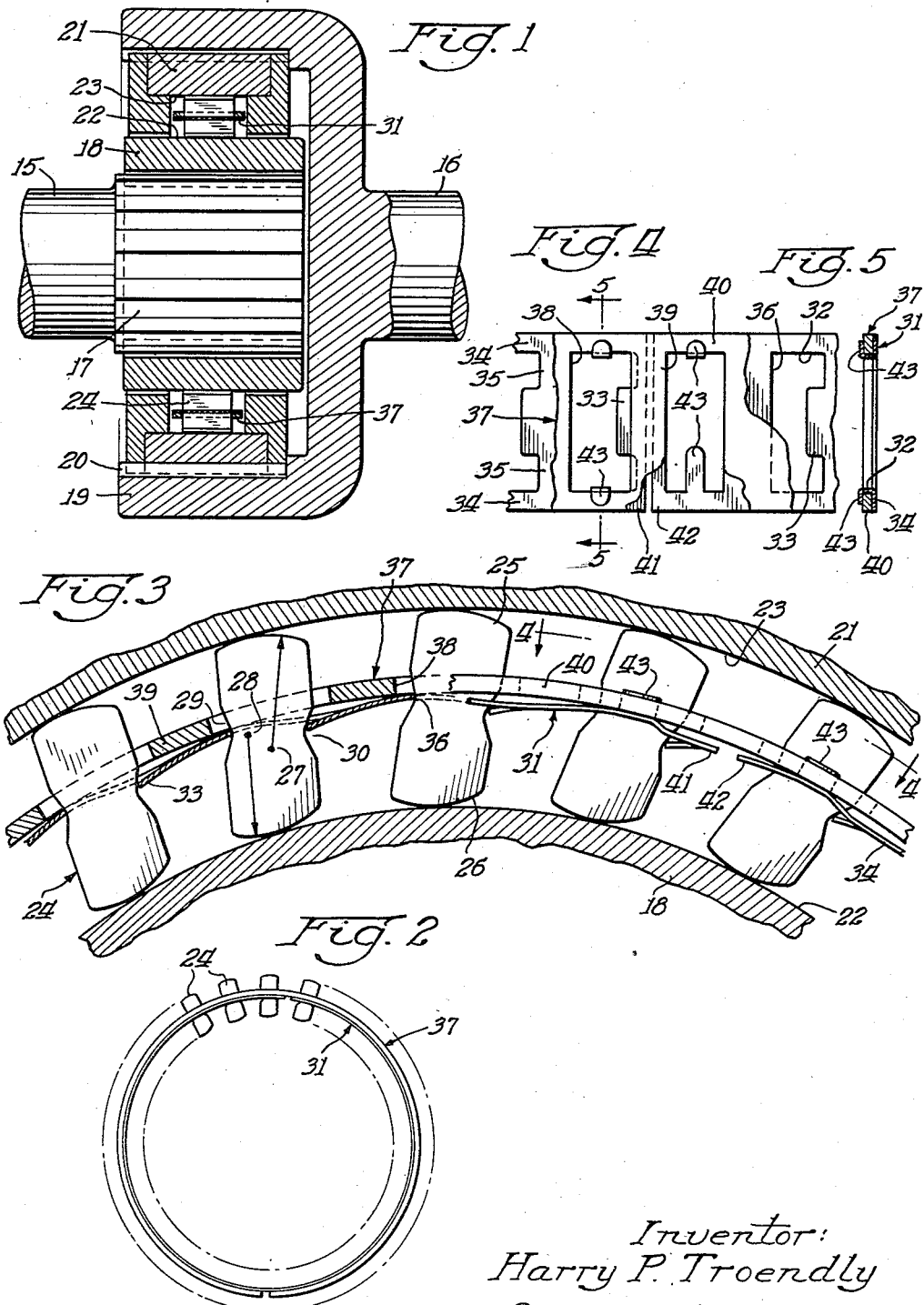
Inventor:
Harry P. Troendly
By: Edward C. Gritzbaugh
Atty.

July 13, 1954 — H. P. TROENDLY — 2,683,510
ONE-WAY ENGAGING DEVICE
Filed Dec. 29, 1950 — 2 Sheets-Sheet 2
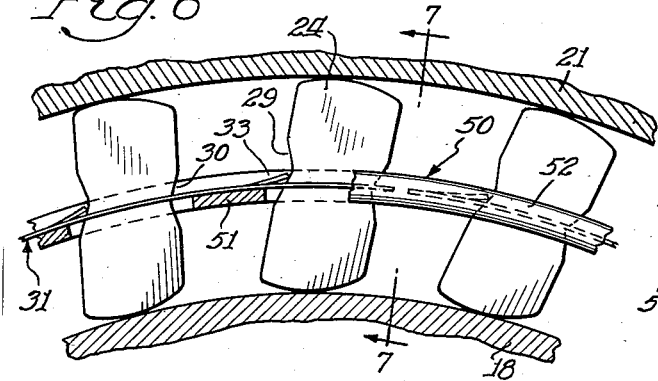
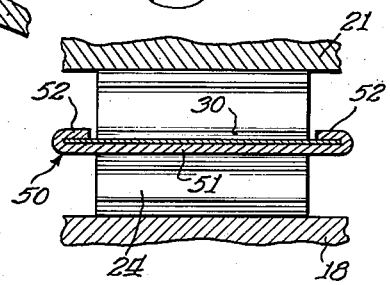
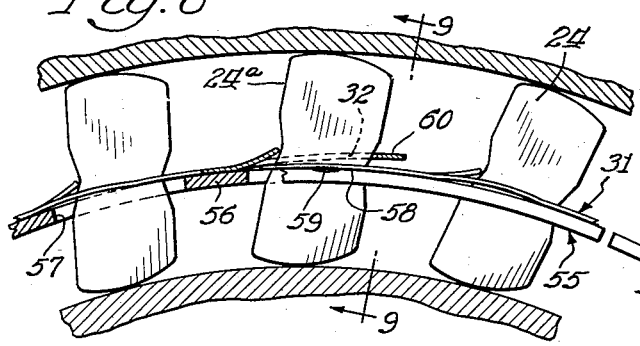
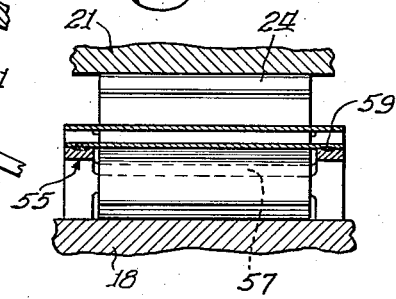
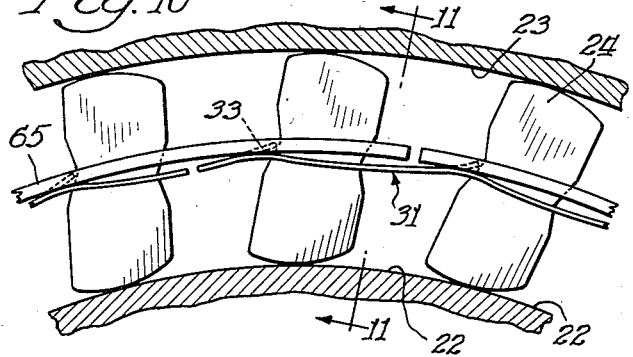
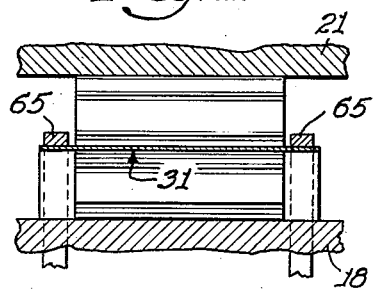
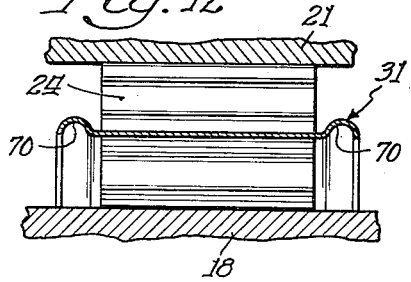
Inventor:
Harry P. Troendly
By: Edward C. Gritzbaugh
Atty.

Patented July 13, 1954

2,683,510

UNITED STATES PATENT OFFICE 2,683,510

ONE-WAY ENGAGING DEVICE

Harry P. Troendly, La Grange Park, Ill., assignor to Borg-Warner Corporation, Chicago, Ill., a corporation of Illinois Application December 29, 1950, Serial No. 203,381

35 Claims. (Cl. 192—45.1)

My invention relates to one-way engaging devices and more particularly to such devices of the type employing tiltable sprags or grippers disposed between opposed races and a sprag cage or retainer of a resilient material strip for tilting the sprags into engagement with the races by spring action of the cage, and my invention constitutes an improvement on the one-way engaging devices of this type shown in a copending application by Ernest A. Ferris, Serial No. 202,385, filed December 22, 1950.

I have found with one-way engaging devices of this type that the resilient cage, which is preferably formed of a flexible sheet metal ribbon for providing the appropriate engaging forces for the sprags, under certain rather extraordinary conditions buckles excessively to cause breakage or fatigue of the ribbon, due to one or more isolated sprags engaging without simultaneous engagement of the other sprags. This condition has been found to exist particularly at very cold temperatures at which the lubricating oil used is quite thick and relatively impenetrable by the sprags under the spring pressures supplied by the resilient cage.

It is an object of this invention to provide means for rigidifying the resilient cage and for holding the sprags spaced positively with respect to each other, so that engaging movement of one or more isolated sprags cannot cause excessive buckling of the sheet metal cage particularly at cold temperatures.

More particularly it is an object of the invention to provide an additional cage for the sprags of relatively rigid material which prevents substantial movement of each of the sprags toward each other. It is another object of the invention to provide an embodiment of the invention which includes relatively rigid means fixed to the sides of the sheet metal cage for rigidifying it, and I contemplate that preferably these rigidifying means shall be parts of such a rigid cage as just mentioned.

It is another object of the invention to provide spring means for urging the sprags and the resilient cage toward one or the other of the opposing races under spring pressure, and it is contemplated that this spring means shall also strengthen and rigidify the resilient metal cage against buckling.

It is still another object of the invention to provide an embodiment in which the sheet metal resilient cage is provided with channels formed therein for longitudinally strengthening the cage without the addition of an extra, rigid cage.

The invention consists of the novel constructions, arrangements and devices to be hereinafter described and claimed for carrying out the above stated objects and such other objects as will be apparent from the following description of preferred embodiments of the invention, illustrated with reference to the accompanying drawings, in which:

Fig. 1 is a longitudinal, sectional view of a one-way engaging device embodying the principles of the invention and including a series of sprags acted on by a resilient cage or retainer and spaced by a relatively rigid cage;

Fig. 2 is a side view of the sprags assembled with the two cages just mentioned;

Fig. 3 is a partial side and sectional view on an enlarged scale of the one-way device;

Fig. 4 is a view on a reduced scale taken on line 4—4 of Fig. 3, with the sprags deleted from the illustration for more clearly showing the cages;

Fig. 5 is a sectional view taken on line 5—5 of Fig. 4;

Fig. 6 is a partial side and sectional view, similar to Fig. 3, of a modification of the invention;

Fig. 7 is a sectional view taken on line 7—7 of Fig. 6;

Fig. 8 is a view similar to Figs. 6 and 3 of another modification of the invention;

Fig. 9 is a sectional view taken on line 9—9 of Fig. 8;

Fig. 10 is a view similar to Figs. 8, 6 and 3 of still another modification of the invention;

Fig. 11 is a sectional view taken on line 11—11 of Fig. 10; and

Fig. 12 is a sectional view similar to Figs. 11, 9 and 7 of another modification of the invention.

Like characters of reference designate like parts in the several views.

Referring now to Figs. 1, 2, 3, 4 and 5 in particular, the illustrated embodiment of one-way engaging device comprises two axially disposed shafts 15 and 16. The shaft 15 is formed with splines 17 and an annular inner race 18 is disposed on the shaft 15 in splined relationship with the splines 17. The shaft 16 is formed with a belled portion 19 provided with splines 20 on its inner surface. An outer annular race 21 is disposed in the belled portion 19 in splined relationship with the splines 20. The inner race 18 has an outwardly facing cylindrical race surface 22, and the race 21 has an inwardly facing cylindrical race surface 23 which are spaced from each other and face each other.

A plurality of tiltable sprags or grippers 24 are disposed between the race surfaces 22 and 23 and are adapted to be tilted to simultaneously wedge between and grip these two surfaces. The sprags 24 are each provided with oppositely disposed race engaging surfaces 25 and 26. The surfaces 25 and 26 may have many various shaped curves in cross section; however, the surfaces are shown as being cylindrical, the surfaces 25 and 26 being respectively formed from parallel center lines passing respectively through points 27 and 28 which are so disposed with respect to each other that the sprags engage with and between the race surfaces 22 and 23 when the sprags are tilted in a counterclockwise direction as seen in Fig. 3. A slot 29 is formed in one side of each of the sprags 24, and a slot 30 is formed in the other side of the sprag, with both of the slots extending longitudinally of the sprag, as shown. It will be noted that the slot 29 is located closer to the cylindrical surface 25 than is the slot 30.

A sprag retaining and springing cage or retainer 31 in the form of a perforated ribbon or strip of resilient sheet metal, for example, of clock spring steel, cold rolled stainless steel or beryllium copper, is provided. The ribbon is flexible such that it does not take a permanent set either in its flat form or when put into a generally circular configuration, as is illustrated in Fig. 3 in assembled position. The ribbon may be, for example, of .007 to .009 inch thick for clock spring and cold rolled stainless steel and may have a thickness of .012 to .015 inch for beryllium copper. The member 31 is provided with a series of windows 32 therein and tabs 33 extending into each of the windows. The windows are bounded by longitudinally extending side portions 34 and transversely extending connecting portions comprising the tab 33 and relatively narrow connecting portions 35.

The sprags 24 are each positioned in a window 32 with the rear edge 36 of a transversely extending connecting portion disposed in the slot 29 and the adjacent tab 33 disposed in the slot 30. The sprags may be so placed in the windows when the member 31 is out of position with respect to the races 18 and 21 and are snapped into position, causing flexing of the tabs 33 in particular, as well as a torsional twist of the portions 35, until the tabs 33 are disposed in the slots 30. The sprags then are free within the windows so that there is no flexing of any of the portions of the member 31 due to the mere presence of the sprags in the windows.

A relatively rigid cylindrical cage 37 is provided exteriorly of the ribbon 31 when the sprags and ribbon are assembled between the races 18 and 21. The cage 37 has windows 38 through which the sprags project. The windows 38 are defined by transversely extending portions 39 and longitudinally extending portions 40.

The sprag retainer 31 may simply be allowed to lie loosely within the cage 37 without being fixed thereto; however, the retainer 31 in the illustrated embodiment in its windows 32 adjacent the ends 41 and 42 of the ribbon is formed with anchoring tabs 43 which are bent through adjacent windows 38 in the rigid cage 37 and over the longitudinally extending portions 40 forming the respective windows 38. The ends 41 and 42 of the ribbon are thus fixed with respect to the cage 37 which fixation, however, allows a limited sliding of the ribbon 31 with respect to the cage 37, as the tabs 43 may slide on the portions 40 of the rigid cage.

In operation, the sprags 24 will frictionally engage and will be wedged between the inner and outer race surfaces 22 and 23 when the shaft 15 and inner race 18 are rotated in the clockwise direction as seen in Fig. 3, so that a drive will be provided in this direction of rotation to the shaft 16. When the shaft 15 tends to rotate in the opposite direction, the race 18 will tilt the sprags 24 in a clockwise direction against the spring action of the tabs 33 so as to release the sprags from wedging engagement with the race surfaces 22 and 23, and there will be no drive from the shaft 15 to the shaft 16. Assuming that the shaft 16 is driven by a prime mover instead of the shaft 15, engagement of the sprags 24 with the races 18 and 21 will take place when the shaft 16 rotates in the counterclockwise direction as seen in Fig. 3 while a disengagement of the sprags takes place if the rotation is in the opposite direction, as will be apparent. Either of the races 18 or 21 may also be anchored and held stationary by any suitable means, if desired, and, in this case, rotation of the other race and its shaft is allowed by the sprags to take place in only one direction, due to engagement of the sprags, with the one-way engaging device in this case functioning as a brake instead of a clutch.

With the ribbon cage 31 and the rigid cage 37 disposed in operative relation between the inner and outer races 18 and 21, the resilient ribbon 31 has the dual function of providing a spring engaging force for the sprags and also holds the sprags spaced with respect to each other. The cage 37 functions as a spacing means for holding the sprags out of engagement with each other, assuming that the longitudinal rigidity of the metal ribbon 31 under certain conditions is not sufficient for doing this, such as, for example when the one-way device is used with cold lubricant which does not permit all of the sprags 24 to penetrate the lubricant and engage the surfaces 22 and 23 simultaneously whereby excessive buckling of the ribbon 31 which would cause breakage or fatigue of the ribbon tends to take place. If simultaneous engagement of all sprags does not take place, the rigid cage 37 is rotated due to engagement therewith by the sprags which do tilt and engage with the inner and outer races, and the cage 37 contacts the sprags which are not engaged by means of the transversely extending portions 39 and urges them with still greater force to engage with the inner and outer races to correct the condition.

When the ribbon 31 and sprags 24 are disassembled from the remainder of the one-way device, the ribbon 31 holds the sprags from dropping out of it, in view of the fact that the tabs 33 are originally bent in order to snap the sprags 24 in place within the windows 32. The sprags and cage may thus be shipped and used as a subassembly and unit, and the rigid cage 37 may also be included in the assembly, if desired. The sprags may be assembled into the openings 32 by moving them from the outside of the ribbon 31 inwardly through the windows against the flexing and spring action of the tabs 33, and after the tabs 33 have passed into the notches 30 and the edges 36 extend into the notches 29, the tabs 33 will return to their unflexed positions, so that the sprags are held loosely within the windows 32.

The embodiment of the invention illustrated in Figs. 6 and 7 differs principally from that illustrated in Figs. 1 to 5 in that a rigid cage is disposed inwardly with respect to the sheet metal ribbon sprag retainer and the cage is clamped at its edges over the edges of the metal ribbon.

The metal ribbon 31 is similar to that shown in the preceding figures; however, the tabs 33 are positioned in the slots 29 of the sprags 24 instead of in the slots 30, and the tabs 33 tend to move inwardly under their spring action and tend to rotate the sprags 24 counterclockwise as seen in Fig. 6 into their race engaging positions.

A rigid cage 50 is disposed within the sheet metal ribbon 31 and has cross portions 51 extending between the sprags. The rigid cage is formed with a return bent portion 52 on each of its circumferential edges overlying and clamped over the longitudinally extending side edges of the metal ribbon 31 so as to be substantially U-shaped in cross section at its side edges with portions inside as well as outside of the edges of the resilient cage. The cage 50 imparts rigidity to the ribbon cage 31 and holds the sprags spaced in the same manner as the cage 37 in the first embodiment and in addition gives rigidity to the ribbon 31 by means of its return bent portions 52 which overlie and are fixed by clamping with respect to the side edges of the resilient cage 31.

The embodiment of the invention illustrated in Figs. 8 and 9 is quite similar to that shown in Figs. 1 to 5 except that a rigid cage is used inside the sheet metal ribbon sprag retainer 31 instead of outside the ribbon retainer. The rigid cage 55 disposed inside the metal ribbon 31 is provided with cross portions 56 forming windows 57 for the sprags 24. The sprags are placed in the metal ribbon 31 in the same manner as in the embodiment shown in Figs. 6 and 7. The metal ribbon need not be fixed with respect to the rigid cage 55; however, in the illustrated embodiment, one end 58 of the metal ribbon 31 is welded as at 59 to the rigid cage 55 and a window 32 in the other end 60 of the ribbon overlies and embraces the sprag 24a adjacent the weld 59 for holding the resilient cage 31 fixed around the rigid cage 55.

The form of the invention shown in Figs. 10 and 11 comprises the sheet metal ribbon sprag retainer 31 utilized in the same manner as in the Figs. 6 and 7 embodiment for holding the sprags 24 under spring pressure in engagement with the race surfaces 22 and 23. For the purpose of strengthening the ribbon 31 against compression and buckling two split spring rings 65 are disposed on the edges of the ribbon 31 adjacent the ends of the sprags 24. These sprags 65 also tend to move the sprags 24 and ribbon 31 inwardly by spring pressure toward the surface 22, and the spring action of the tabs 33 limits the contraction of the spring rings 65.

The embodiment of the invention illustrated in Fig. 12 is quite similar to the previously described forms of the invention except that no rigid cage is used, and the perforated metal ribbon 31 is used, either disposed with the tabs 33 within the slots 30 as shown in Fig. 3 or with the tabs 33 disposed in the slots 29 as shown in Fig. 6. In the Fig. 12 embodiment, the ribbon 31 is formed and set with inwardly extending channel portions 70 for imparting to the ribbon a longitudinal rigidity in excess of that which the ribbon would have in its forms in which it is shown in the previously described embodiments. The ribbon itself in this case provides the increased rigidity necessary for preventing a buckling of the ribbon.

The additional cage of relatively rigid metal in certain embodiments of the invention advantageously assures that the sprags remain spaced from each other and that regardless of the fact that one of the sprags may tend to engage without simultaneous engagement of others, the sprags cannot move toward each other and excessively buckle the relatively thin ribbon cage. In the Fig. 1 embodiment, the rigid cage has still another advantageous function, namely, the cage moves relative to the resilient metal cage when certain of the sprags engage while others do not, as for example, when the oil used in lubricating the one-way device is cold, the movement of the rigid cage being under impetus from the sprags which do tilt to engage so that the rigid cage acts on the other sprags and tends to cause their engagement also. The rigid cage in certain embodiments advantageously is in contact with the resilient cage and tends to rigidify and strengthen the latter. The cage 31 is held fixed with respect to the cage 37 by the tabs 43 in the Fig. 1 embodiment which, however, allow a limited movement of the cage 31 with respect to the cage 37 due to the sliding motion that the tabs 43 may have on the sides 40 of the openings 38 through which the tabs extend.

The embodiment of the invention in Figs. 6 and 7 advantageously includes the rigid cage 50 which throughout its length is fixed with respect to the sides of the resilient cage 31 by means of the return bent portions 52 overlapping the sides of the resilient cage and thus further rigidifies the resilient cage.

In the Fig. 8 embodiment of the invention, the rigid cage 55 is disposed inside of the resilient cage 31 instead of outside it as in the embodiment shown in Figs. 1 to 5, and both forms of the invention function satisfactorily. The resilient cage 31 has an advantageous fastening to the rigid cage which includes the weld 59 and a window on the other end of the resilient cage which overlies and embraces the sprag 24a adjacent the weld 59.

The embodiment of the invention illustrated in Figs. 10 and 11 advantageously includes the spring rings 65 which not only function to longitudinally rigidify the resilient sheet metal cage but also urge the sprags 24 with spring pressure into greater pressure on the inner race surface 22 than on the outer race surface 23 thereby reducing the friction and the wear on the outer race surface. This is particularly advantageous when the one-way engaging device is used in such a manner that the sprags 24 stay with the inner race while the outer race 23 moves with respect to both the sprags and inner race.

The embodiment of the invention illustrated in Fig. 12 provides means for longitudinally rigidifying the resilient cage 31 without the necessity of providing an additional member in the form of a rigid cage. The channels 70 provide this rigidifying function.

I wish it to be understood that my invention is not to be limited to the specific constructions and arrangements shown and described, except only insofar as the claims may be so limited, as it will be understood to those skilled in the art that changes may be made without departing from the principles of the invention.

I claim:

1. In a one-way engaging device, two opposed races, a series of tiltable sprags interposed between said races and adapted to wedge between the races on tilting of the sprags, a cage of relatively light and flexible spring material having peripherally spaced openings therein defined by transversely extending portions passing between the sprags and longitudinally extending portions connecting the transversely extending portions, said sprags being enclosed in said openings with said transversely extending portions in engagement with and acting on said sprags so as to urge them by spring action of the cage itself to tilt and wedge between said races, and means for imparting longitudinal rigidity to said longitudinally extending portions for holding said sprags spaced from each other during operation of the one-way engaging device.

2. In a one-way engaging device, two opposed races, a series of tiltable sprags interposed between said races and adapted to wedge between the races on tilting of the sprags, a cage of relatively light and flexible spring material having peripherally spaced openings therein receiving and enclosing said sprags, said openings being defined in part by transversely extending portions of said cage and said transversely extending portions acting on peripherally spaced sides of said sprags for urging them to tilt and wedge between said races by spring action of the cage, and a second cage of relatively rigid material having peripherally spaced openings receiving said sprags and in contact with said flexible cage and functioning to hold said sprags spaced from each other against forces tending to buckle said flexible cage.

3. In a one-way engaging device, two opposed races, a series of tiltable sprags interposed between said races and adapted to wedge between the races on tilting of the sprags, a cage of relatively light and flexible spring material having peripherally spaced openings for receiving and enclosing the sprags, the peripherally spaced sides of said openings acting on said sprags for urging them to tilt and wedge between said races under spring action, and a cage having openings larger than the openings in said flexible cage for receiving said sprags and functioning to permit said flexible cage to tilt said sprags, said last-named cage being effective to hold the sprags spaced from each other against forces tending to buckle said flexible cage.

4. In a one-way engaging device, two opposed races, a series of tiltable sprags interposed between said races and adapted to wedge between the races on tilting of the sprags, a cage of relatively light and flexible spring material strip having radially extending openings for receiving and enclosing said sprags with the peripherally spaced sides of the openings engaging the sprags for urging them to tilt and wedge between said races by the spring action of the cage, a cage of relatively rigid material having radially extending openings for receiving said sprags for holding said sprags spaced from each other against forces tending to buckle said flexible member, and means for attaching said flexible cage at at least one of its ends with respect to said rigid cage for preventing separation of the two cages.

5. In a one-way engaging device, two opposed races, a series of tiltable sprags interposed between said races and adapted to wedge between the races on tilting of the sprags, a cage of relatively light and flexible spring material strip having radially extending openings for receiving and enclosing said sprags, the sides of said openings acting on the sprags for urging them to tilt and wedge between said races by spring action of the cage, a relatively rigid cage having radially extending openings larger in size than the openings in said first named cage for receiving and enclosing said sprags and functioning to hold the sprags spaced from each other against forces tending to buckle said flexible cage, and tabs formed on said flexible cage at both ends thereof and extending into openings of the rigid cage and bent to overlie portions of the latter cage for preventing separation of said flexible cage at its two ends with respect to the rigid cage.

6. In a one-way engaging device, inner and outer concentric races, a series of tiltable sprags interposed between said races and adapted to wedge between the races on tilting of the sprags, a cage of relatively light and flexible spring strip material having radially extending openings for receiving and enclosing said sprags, peripherally opposed sides of said openings engaging said sprags and the adjacent portions of said cage acting on said sprags for urging the sprags to tilt and wedge between said races by spring action of the cage, and a cage of relatively rigid material having radially extending openings for receiving said sprags and disposed outside of said flexible cage for holding said sprags spaced from each other against forces tending to buckle said flexible cage and for transmitting a tilting movement of one of the sprags to other sprags.

7. In a one-way engaging device, two opposed races, a series of tiltable sprags interposed between said races and adapted to wedge between the races on tilting of the sprags, a cage of relatively light and flexible spring material having openings for receiving said sprags and urging the sprags to tilt and wedge between said races under spring action by means of the sides of said openings, and a relatively rigid cage having openings for receiving said sprags for holding said sprags spaced from each other against forces tending to buckle said flexible cage, said rigid cage being lapped around edges of said flexible cage for fixing the two cages together and rigidifying the flexible cage.

8. In a one-way engaging device, two opposed races, a series of tiltable sprags interposed between said races and adapted to wedge between the races on tilting of the sprags, a member of relatively light and flexible spring material strip for acting on said sprags for urging them to tilt and wedge between said races under spring action of the strip, and a strip of relatively rigid material fixed to a longitudinal edge of said flexible strip for rigidifying the flexible strip and preventing buckling thereof.

9. In a one-way engaging device, two opposed races, a series of tiltable sprags interposed between said races and adapted to wedge between the races on tilting of the sprags, a cage of relatively light and flexible spring material strip having openings therein for receiving said sprags and urging the sprags to tilt and wedge between said races under spring action by means of sides of the openings in engagement with the sprags, and strips of relatively rigid material fixed to opposite longitudinal edges of said flexible strip for rigidifying the flexible strip.

10. In a one-way engaging device, two opposed races, a series of tiltable sprags interposed between said races and adapted to wedge between the races on tilting of the sprags, a cage of relatively light and flexible spring material strip having openings therein for receiving said sprags and acting on said sprags by means of sides of said openings for urging them to tilt and wedge between said races under spring action, and return bent portions of a relatively rigid material lapping the longitudinal side edges of said flexible cage for rigidifying the cage against buckling.

11. In a one-way engaging device, inner and outer concentric races, a series of tiltable sprags interposed between said races and adapted to wedge between the races on tilting of the sprags, a cage of relatively light and flexible spring material having openings therein for receiving said sprags and acting on said sprags from sides of the openings for urging the sprags to tilt and wedge between said races under spring action of the cage, and a relatively rigid cage having openings for receiving said sprags and disposed in contact with and inside of said first named cage for holding said sprags spaced from each other against forces tending to buckle said flexible cage.

12. In a one-way engaging device, two opposed races, a series of tiltable sprags interposed between said races and adapted to wedge between the races on tilting of the sprags, a cage of a strip of relatively light and flexible spring material having openings for receiving said sprags and acting on the sprags for urging them to tilt and to wedge between said races under spring action of the cage due to engagement of sides of the openings with the sprags, and a cage of relatively rigid material having openings for receiving said sprags for holding said sprags spaced from each other against forces tending to buckle said flexible cage, said flexible cage being fixed at one end to said relatively rigid cage adjacent a certain said sprag and having its other end embracing said sprag for thereby fixing the flexible cage with respect to the rigid cage.

13. In a one-way engaging device, inner and outer concentric races, a series of tiltable sprags interposed between said races and adapted to wedge between the races on tilting of the sprags, a strip of relatively light and flexible spring material fixed with respect to said sprags and acting on them for urging them to tilt and wedge between said races, and spring means acting on said strip and urging the sprags and strip toward one of said races.

14. In a one-way engaging device, inner and outer concentric races, a series of tiltable sprags interposed between said races and adapted to wedge between the races on tilting of the sprags, a cage of relatively light and flexible spring material having openings for receiving said sprags and acting on said sprags by sides of the openings in engagement with the sprags to tilt and wedge the sprags between said races by spring action, and rings of spring material in contact with edges of said flexible cage for rigidifying the cage and urging the cage and sprags toward one of said races by spring action of the rings.

15. In a one-way engaging device, inner and outer concentric races, a series of tiltable sprags interposed between said races and adapted to wedge between the races on tilting of the sprags and having slots in opposite sides thereof, a cage of relatively light and flexible spring material strip having openings for receiving said sprags the sides of which are disposed in said slots for acting on the sprags for urging them to tilt and wedge between said races under spring action of the cage, and a pair of rings of spring material encircling edges of said cage for urging the cage and sprags toward said inner race and rigidifying the flexible cage.

16. In a one-way engaging device, two opposed races, a series of tiltable sprags interposed between said races and adapted to wedge between the races on tilting of the sprags, and a cage of relatively light and flexible spring material having transversely extending portions in contact with said sprags and a longitudinally extending portion joining the transversely extending portions, said transversely extending portions urging said sprags to tilt and wedge between said races under spring action, said longitudinally extending portion being formed with a channel therein for rigidifying the cage against longitudinal buckling.

17. In a one-way engaging device, two opposed races, a series of tiltable sprags interposed between said races and adapted to wedge between the races on tilting of the sprags, and a cage of relatively light and flexible spring material strip having openings therein defined by transversely extending portions in contact with said sprags and connected by two longitudinally extending side portions for receiving said sprags for urging the sprags to tilt and wedge between said races due to the spring action of said transversely extending portions, said longitudinally extending side portions being formed with longitudinally extending channels therein for rigidifying the flexible cage against buckling.

18. In a sprag and cage assembly for a one-way engaging device, the combination of a cage having a series of peripherally spaced radially extending openings therein and sprags adapted to be tilted to engage between two opposed races of the one-way device enclosed by said openings, each of the openings in said cage having opposed peripherally spaced sides engaged with said sprags for holding the sprags from moving out of the openings, said cage being of resilient sheet material and said peripherally spaced sides of said openings being adapted to exert a biasing force to thereby tilt said sprags in a race engaging direction under spring action of the cage itself, and means for rigidifying the cage for holding the sprags spaced from each other against forces tending to buckle said cage.

19. In a sprag and cage assembly for a one-way engaging device, the combination of a cage having a series of peripherally spaced radially extending openings therein, a sprag adapted to be tilted to engage between two opposed races of the one-way device enclosed in each of said openings and held from moving out of the opening by contact with opposed peripherally spaced sides of the opening, said cage being of resilient sheet metal and the sides of said openings acting on the sprags so as to tilt said sprags in a race engaging direction under spring action of the cage itself, and a second cage of relatively rigid material having peripherally spaced radially extending openings for enclosing said sprags for holding the sprags spaced from each other against forces tending to buckle said first named cage.

20. In a sprag and cage assembly for a one-way engaging device, the combination of a cage having a series of openings therein, a sprag adapted to be tilted to engage between two opposed races of the one-way device positioned in each of said openings and held from moving out of the opening by contact with the sides of the opening, said cage being of resilient sheet metal adapted to tilt said sprags in a race engaging direction under spring action, a second cage of relatively rigid material having openings for receiving said sprags for holding said sprags spaced from each other against forces tending to buckle said first named cage, and means for fixing said first named cage to said second named cage at least at one end of the first named cage.

21. In a sprag and cage assembly for a one-way engaging device, the combination of a cage having a series of openings therein, a sprag adapted to be tilted to engage between two opposed races of the one-way device positioned in each of said openings and held from moving out of the opening by contact with the sides of the opening, said cage being of resilient sheet metal adapted to tilt said sprags in a race engaging direction under spring action, and rings of rigid material fixed to the side edges of said resilient cage for rigidifying the cage against forces tending to buckle the cage.

22. In a sprag and cage assembly for a one-way engaging device, the combination of a cage having a series of openings therein, a sprag adapted to be tilted to engage between two opposed races of the one-way device positioned in each of said openings and held from moving out of the opening by contact with the sides of the opening, said cage being of a resilient sheet metal strip adapted to tilt said sprags in a race engaging direction under spring action, and spring rings positioned on side edges of the sheet metal cage for rigidifying the cage.

23. In a sprag and cage assembly for a one-way engaging device, the combination of a cage having a series of openings therein and a sprag adapted to be tilted to engage between two opposed races of the one-way device positioned in each of said openings and held from moving out of the opening by contact with the sides of the opening, said cage being of a resilient sheet metal ribbon adapted to tilt said sprags in a race engaging direction under spring action and being formed with channels in its side edges for longitudinally rigidifying the cage against buckling.

24. A cage assembly adapted to peripherally space and tilt a plurality of sprags into engagement with two opposed races comprising a cage having a series of peripherally spaced radially extending openings therein for receiving and enclosing the sprags and holding them from moving out of the openings by contact with peripherally spaced sides of the openings, said cage being of resilient sheet material such that said peripherally spaced sides of the openings are adapted to resiliently bias the sprags in a race engaging direction under spring action, and means for rigidifying the cage so as to hold the sprags spaced from each other against forces tending to buckle said cage.

25. A cage assembly adapted to space and tilt a plurality of wedging devices into wedging engagement with a pair of races comprising a first strip of relatively flexible material having openings therein adapted to enclose the wedging devices and the flexible material being effective to exert a biasing force on the wedging device to tilt the wedging devices into wedging engagement with the races when the wedging devices are disposed in the openings, and a second strip of substantially rigid material having openings therein larger than the openings in the first strip and adapted to enclose the wedging devices and permit tilting thereof by said first strip, the rigidity of the second strip being effective to hold the wedging devices spaced from each other against forces tending to buckle the first flexible strip.

26. A cage assembly adapted to space and tilt a plurality of wedging devices into wedging engagement with a pair of concentric races comprising a first strip of relatively flexible material adapted to be disposed concentrically between said races and having openings therein adapted to receive the wedging devices and being effective to tilt the wedging devices into wedging engagement with the races when the wedging devices are disposed in the openings, and a second strip of substantially rigid material adapted to be disposed outside of the flexible strip and having openings therein larger than the openings in the first strip and adapted to receive the wedging devices and permit tilting thereof by said first strip, the rigidity of the second strip being effective to hold the wedging devices spaced from each other against forces tending to buckle the flexible strip.

27. A cage assembly adapted to space and tilt a plurality of wedging devices into wedging engagement with a pair of concentric races comprising a first strip of relatively flexible material adapted to be disposed concentrically between said races and having openings therein adapted to receive the wedging devices and being effective to tilt the wedging devices into wedging engagement with the races when the wedging devices are disposed in the openings, and a second strip of substantially rigid material adapted to be disposed inside of the flexible strip and having openings therein larger than the openings in the first strip and adapted to receive the wedging devices and permit tilting thereof by said first strip, the rigidity of the second strip being effective to hold the wedging devices spaced from each other against forces tending to buckle the flexible strip.

28. A cage assembly adapted to space and tilt a plurality of wedging devices into wedging engagement with a pair of races comprising a first strip of relatively flexible material having openings therein adapted to receive the wedging devices and being effective to tilt the wedging devices into wedging engagement with the races when the wedging devices are disposed in the openings, and a second strip of substantially rigid sheet material having openings therein larger than the openings in the first strip adapted to receive the wedging devices and permit tilting thereof by said first strip, the rigidity of the second strip being effective to hold the wedging devices spaced from each other against forces tending to buckle the first flexible strip, and means for connecting said two strips together.

29. A cage assembly adapted to space and tilt a plurality of wedging devices into wedging engagement with a pair of races comprising a first strip of relatively flexible material having openings therein adapted to receive the wedging devices and being effective to tilt the wedging devices into wedging engagement with the races when the wedging devices are disposed in the openings, and a second strip of substantially rigid material having openings therein larger than the openings in the first strip adapted to receive the wedging devices and permit tilting thereof by said first strip, the rigidity of the second strip being effective to hold the wedging devices spaced from each other against forces tending to buckle the first flexible strip, said first flexible strip defining a plurality of tabs adapted to be clinched over edges defined by said second rigid strip for connecting both of said strips together.

30. A cage assembly adapted to space and tilt a plurality of wedging devices into wedging engagement with a pair of races comprising a first strip of relatively flexible material having openings therein adapted to receive the wedging devices and being effective to tilt the wedging devices into wedging engagement with the races when the wedging devices are disposed in the openings, and a second strip of substantially rigid material having openings therein larger than the openings in the first strip adapted to receive the wedging devices and permit tilting thereof by said first strip, the rigidity of the second strip being effective to hold the wedging devices spaced from each other against forces tending to buckle the first flexible strip, said flexible strip including means defining tabs formed on the edges of certain of the openings therein and adapted to be clinched over the edges of corresponding openings in the rigid strip for holding both strips together when they are positioned between the races with the wedging devices disposed in the openings of the strips.

31. A cage assembly adapted to space and tilt a plurality of wedging devices into wedging engagement with a pair of concentric races comprising a first strip of relatively flexible material disposed concentrically between said races and having openings therein adapted to receive the wedging devices and being effective to tilt the wedging devices into wedging engagement with the the races when the wedging devices are disposed in the openings and a second strip of substantially rigid material adapted to be disposed concentrically between the races and having openings therein larger than the openings in the first strip and adapted to receive the wedging devices and permit tilting thereof by said first strip, the rigidity of the second strip being effective to hold the wedging devices spaced from each other against forces tending to buckle the flexible strip, the rigid strip having its circumferential edges bent back over the flexible strip to connect the two strips together.

32. A cage assembly adapted to space and tilt a plurality of wedging devices into wedging engagement with a pair of concentric races comprising a first strip of relatively flexible material adapted to be disposed concentrically between said races and having openings therein adapted to receive the wedging devices and being effective to tilt the wedging devices into wedging engagement with the races when the wedging devices are disposed in the openings, and a second strip of substantially rigid material adapted to be disposed concentrically between the races and having openings therein larger than the openings in the first strip and adapted to receive the wedging devices and permit tilting thereof by said first strip, the rigidity of the second strip being effective to hold the wedging devices spaced from each other against forces tending to buckle the flexible strip, the flexible and rigid strips being joined together by welding.

33. A cage assembly adapted to peripherally space and tilt a plurality of sprags into engagement with two opposed concentric races comprising a cage having a series of openings therein for receiving the sprags and holding them from moving out of the openings by contact with the sides thereof, said cage being of resilient sheet material adapted to tilt the sprags in a race engaging direction under spring action, and longitudinally extending channels formed in the cage to rigidify the cage so as to hold the sprags spaced from each other against forces tending to buckle said cage.

34. A cage assembly adapted to peripherally space and tilt a plurality of sprags into engagement with two opposed concentric races comprising an annular cage having a series of openings therein for receiving the sprags and holding them from moving out of the openings by contact with the sides thereof, said cage being of resilient sheet material adapted to tilt the sprags in a race engaging direction under spring action, and peripherally extending channels formed adjacent the edges of said cage to rigidify the cage so as to hold the sprags spaced from each other against forces tending to buckle the cage when the sprags are disposed in said openings.

35. A cage assembly adapted to peripherally space and tilt a plurality of sprags into engagement with two opposed concentric races comprising an annular cage having a series of openings therein for receiving the sprags and holding them from moving out of the openings by contact with the sides thereof, said cage being of resilient sheet material adapted to tilt the sprags in a race engaging direction under spring action, and a pair of annular rings concentrically disposed around the edges of the cage to rigidify it so as to hold the sprags spaced from each other against forces tending to buckle the cage when the sprags are assembled in the openings therein.

References Cited in the file of this patent

UNITED STATES PATENTS

| Number | Name | Date |
| --- | --- | --- |
| 2,383,595 | Dodge | Aug. 28, 1945 |
| 2,407,772 | Dodge | Sept. 17, 1946 |
| 2,428,962 | Davis | Oct. 14, 1947 |
| 2,542,914 | Farkas et al. | Feb. 20, 1951 |
| 2,570,290 | Turner | Oct. 9, 1951 |